US 6,694,202 B2

(12) United States Patent
Miyazaki (10) Patent No.: US 6,694,202 B2
(45) Date of Patent: Feb. 17, 2004

(54) PRODUCTION MANAGEMENT NETWORK SYSTEM, PRODUCTION MANAGEMENT METHOD AND RECORDING MEDIUM HAVING RECORDED PRODUCTION MANAGEMENT PROGRAM (75) Inventor: Norihiko Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/245,738

(22) Filed: Sep. 18, 2002

(65) Prior Publication Data
US 2003/0023334 A1 Jan. 30, 2003

Related U.S. Application Data (63) Continuation of application No. PCT/JP00/02183, filed on Apr. 4, 2000.

(51) Int. Cl.[7] ............................................... G06F 19/00
(52) U.S. Cl. ............................ 700/96; 705/28; 705/44
(58) Field of Search .......................... 700/96, 97, 100, 700/101, 103, 108; 705/8

(56) References Cited

U.S. PATENT DOCUMENTS

| 5,099,431 A | | 3/1992 | Natarajan .................... 700/105 |
| 5,442,561 A | | 8/1995 | Yoshizawa et al. .......... 700/100 |
| 5,982,362 A | * | 11/1999 | Crater et al. ................. 345/719 |
| 5,983,195 A | * | 11/1999 | Fierro ........................... 705/10 |
| 6,006,199 A | * | 12/1999 | Berlin et al. ................... 705/26 |
| 6,049,787 A | * | 4/2000 | Takahashi et al. ............. 705/44 |
| 6,138,150 A | * | 10/2000 | Nichols et al. .............. 709/219 |
| 6,151,582 A | * | 11/2000 | Huang et al. ................... 705/8 |
| 6,260,024 B1 | * | 7/2001 | Shkedy ......................... 705/37 |
| 6,480,755 B1 | * | 11/2002 | Ootani et al. ................ 700/105 |

FOREIGN PATENT DOCUMENTS

| EP | 0425405 | 5/1991 |
| JP | 59-30111 | 2/1984 |
| JP | 6-214996 | 8/1994 |
| JP | 6-246599 | 9/1994 |
| JP | 9-201747 | 8/1997 |
| JP | 10-326729 | 12/1998 |
| JP | 11-031179 | 2/1999 |
| JP | 11-096225 | 4/1999 |

* cited by examiner

Primary Examiner—Leo Picard
Assistant Examiner—Zoila Cabrera
(74) Attorney, Agent, or Firm—Staas & Halsey LLP (57) ABSTRACT The client accesses a reception screen using a public line and makes a contract with the manufacturer. The client can change the manufacturing process without needing an operator at the manufacturing site. The client also checks the progress status of the manufacturing process.

13 Claims, 8 Drawing Sheets

IF [NO]
    [MANUFACTURER] [OPERATION WILL PROCEED AS SCHEDULED.]

IF [YES]

> [MANUFACTURER] PLEASE CLICK (SELECT) PRODUCT WHICH SCHEDULE IS TO BE CHANGED.
>
> [CLIENT] CLICK PRODUCT WHICH CLIENT CHANGES.
>
> [MANUFACTURER] UP TO WHICH STEP DO YOU WANT TO PROCEED PRODUCT AAAA?
>
> [MANUFACTURER] PLEASE CLICK NUMBER OF STEPS TO PROCEED
>
> [CLIENT] 6.
>
> [MANUFACTURER] THREE STEPS AHEAD. YOU ARE CHARGED ¥30,000. DO YOU AGREE?
>
> [CLIENT] AGREE OR DISAGREE
>
> [MANUFACTURER] YOU AGREE? PLEASE WAIT FOR A WHILE.

IF [DISAGREE] IS SELECTED,
        PRODUCT IS PROCEEDED AS IT IS.

PRODUCTION MANAGEMENT NETWORK SYSTEM, PRODUCTION MANAGEMENT METHOD AND RECORDING MEDIUM HAVING RECORDED PRODUCTION MANAGEMENT PROGRAM

This application is a continuing application, filed under 35 U.S.C. §111(a), of International Application PCT/JP00/02183, filed Apr. 4, 2000.

TECHNICAL FIELD

The present invention relates to a technology that involves a client in the manufacturing process through a communication network.

BACKGROUND ART

In recent years, clients require improved quality and reduced delivery time in manufacturing of semiconductors, electric/electronic components and the like. To meet the demand, manufacturers have taken measures to accurately check the progress, accelerate response to a client's intention, and automate each process.

In the conventional production management system, a schedule is automatically determined when a contract with the client is established. The schedule is determined according to client's requests of for example delivery time, order volume. The product management or manufacturing process management is carried out based on the schedule. If a client requests a change of specification of product during the manufacture the operator will change the process so as not to adversely affect each manufacturing process.

However, the conventional production management system is incapable of dealing with client requests when the operator is absent. The operator may be absent, for example, on holidays or during midnight.

It is an object of the present invention to provide a production management network system in which a client can control the production management process. The production management process includes a series of processes from the contract until delivery, progress status process, and process that occurs during change in manufacturing process.

DISCLOSURE OF THE INVENTION

The production management network system according to one aspect of the present invention comprises a product manufacturing management apparatus and a product progress response apparatus. A client operates the product manufacturing management apparatus and thereby performs a manufacturing contract with the manufacturer of the product and controls a manufacturing process. The client operates the product progress response apparatus to get information about the progress status of the manufacturing process.

A platform screen is provided through which the client operates the product manufacturing management apparatus and the product progress response apparatus through a telephone line.

The production management method according to another aspect of the present invention comprises a client performing an operation to make a manufacturing contract and control a manufacturing process, and a client performing an operation to get information about the progress status of the manufacturing process and controlling the manufacturing process.

A computer readable medium according to still another aspect of the present invention sores therein a computer program that displays information for a client and accepting data from the client so that the client perform an operation to make a manufacturing contract and controls a manufacturing process; and displays information about the progress status of the manufacturing process for the client.

BEST MODE FOR CARRYING OUT THE INVENTION

The present invention will be explained in detail with reference to the accompanying drawings. The configuration of a production management network system according to the present invention will be explained with reference to FIG. 1. The production management network system consists of a product manufacturing management apparatus and a product progress response apparatus. FIG. 2 is a diagram which shows the hardware configuration of a production management network system. The production management network system executes a production management program. The production management program realizes a production management method. The production management program and the production management method will be explained in detail later.

Figure 1:
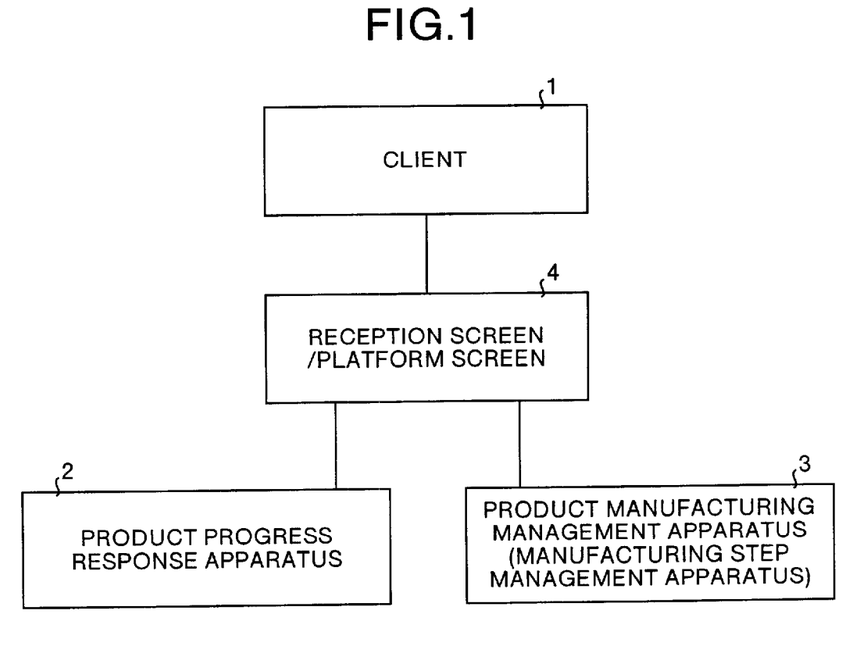
FIG. 1 is a diagram which shows the configuration of a production management network system according to the present invention.
Figure 2:
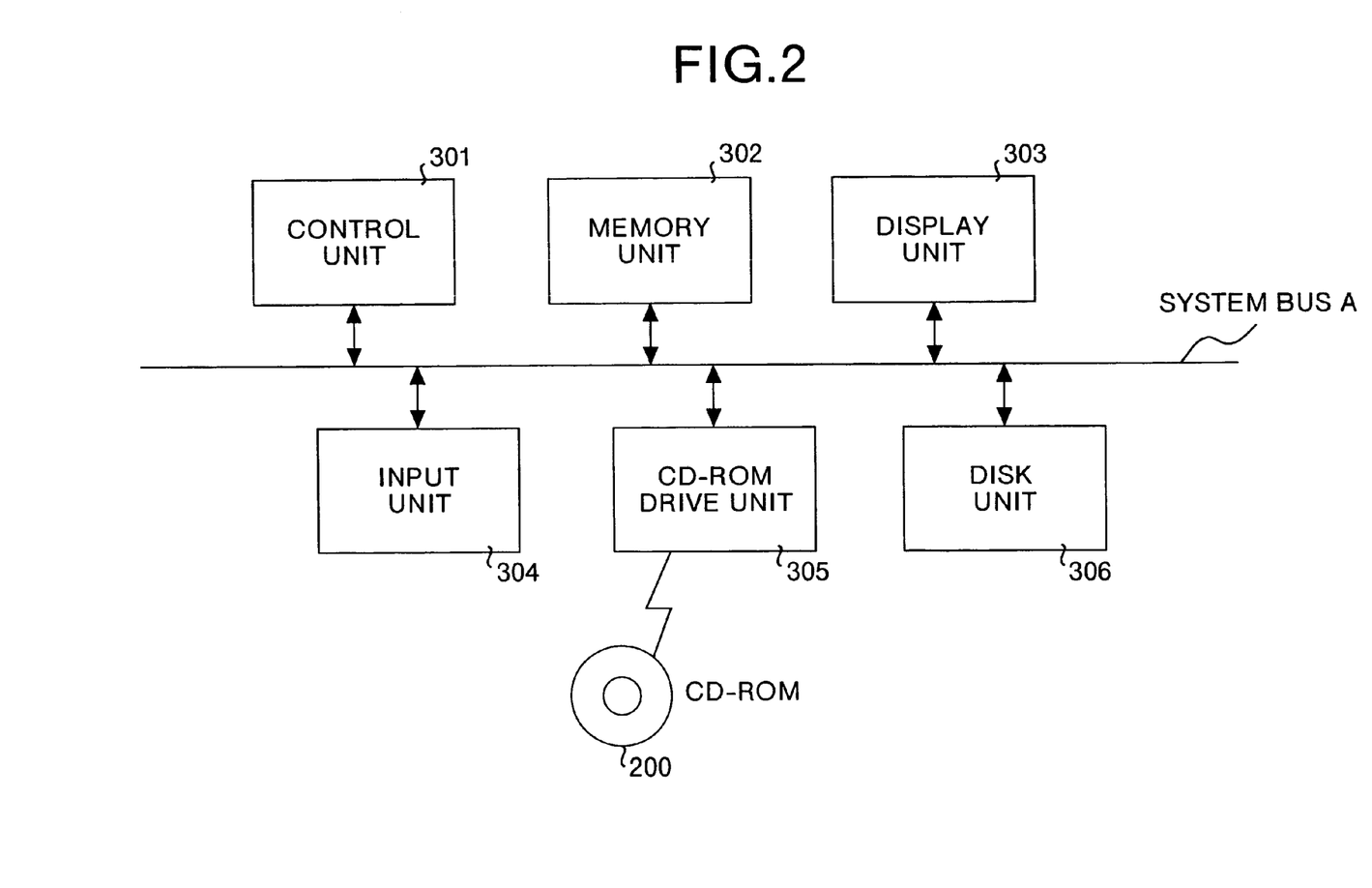
FIG. 2 is a diagram which shows the hardware configuration of a product manufacturing management apparatus and a product progress response apparatus that constitutes the production management network system according to the present invention.

In FIG. 1, reference numeral 1 denotes a client who requests for the manufacture of a product to the manufacturer or a client who checks or controls the progress status of a requested product. Reference numeral 2 denotes a product progress response apparatus that checks the progress status of product and controls the progress in response to a client's request. Reference numeral 3 denotes a product manufacturing management apparatus which manages all processes related to product manufacturing. The product progress response apparatus 2 and the product manufacturing management apparatus 3 are connected to the reception screen (platform screen) 4. The reception screen 4 that is accessed by the client displays the information of the apparatuses. The client 1 is connected to the reception screen 4 by a public line such as an ordinary telephone line or a dedicated ISDN line. The information between client 1 and the reception screen 4 is transmitted by telephone, television conference, electronic mail, electronic conference and the like. The product manufacturing management apparatus 3 also includes an internal manufacturing process management apparatus which manages the process database.

As shown in FIG. 2, the apparatus consists of a control unit 301 or CPU, a memory unit 302, a display unit 303, an input unit 304, a CD-ROM drive unit 305, and a disk unit 306. The units are connected to each other through a system bus A.

The control unit 301 executes the production management program. The production management program includes a product progress response program or a product manufacturing management program. The memory unit 302 includes a RAM that is employed as a work area, a ROM which stores the boot program and the like, and a database or hard disk that stores the production management program and the like. The memory unit 302 stores the program to be executed by the control unit 301 and also stores the data that is acquired in other processes. The database of the memory unit 302 includes a logical information database, a location management database, a new logical information database and the like. The logical information database stores information of previous progress status of products. The location management database stores product information. The new logical information database stores information that is newly set in the system.

The display unit 303 consists of a CRT, a liquid display panel and the like. The display unit 303 exercises control to provide the client with various screens that appear on the reception screen 4. The input/output unit 304 consists of a keyboard, a mouse, a scanner, a printer and the like. The client uses the input/output unit 304 to input and output information.

A CD-ROM 200 shown in FIG. 1 stores the production management program. The information stored in the database of memory unit 302 is not restricted to any format. The information may also be stored in the memory unit of other systems that will be connected to the program management network system through a network.

The production management program that includes the product progress response program and the product manufacturing management program is installed from the CD-ROM 200 set in a CD-ROM drive unit 305 into the disk unit 306. The production management program that is read from the disk unit 306 when the system starts is stored in the memory unit 302. The control unit 301 or the CPU controls the product manufacturing contract and the manufacturing process of the product manufacturing management apparatus 3. The control unit 301 also controls the product progress response apparatus 2 that generates the progress status of the product. The execution of the control unit 301 is performed in accordance with the production management program which is stored in the memory unit 302.

The storage medium for the production management program is not limited to CD-ROM 200 but other storage medium like magnetic disk can be employed as a storage medium depending on the configuration of the computer. The magnetic disk storage medium could be a floppy disk, a magneto-optical disk or a magnetic tape.

Figure 3:
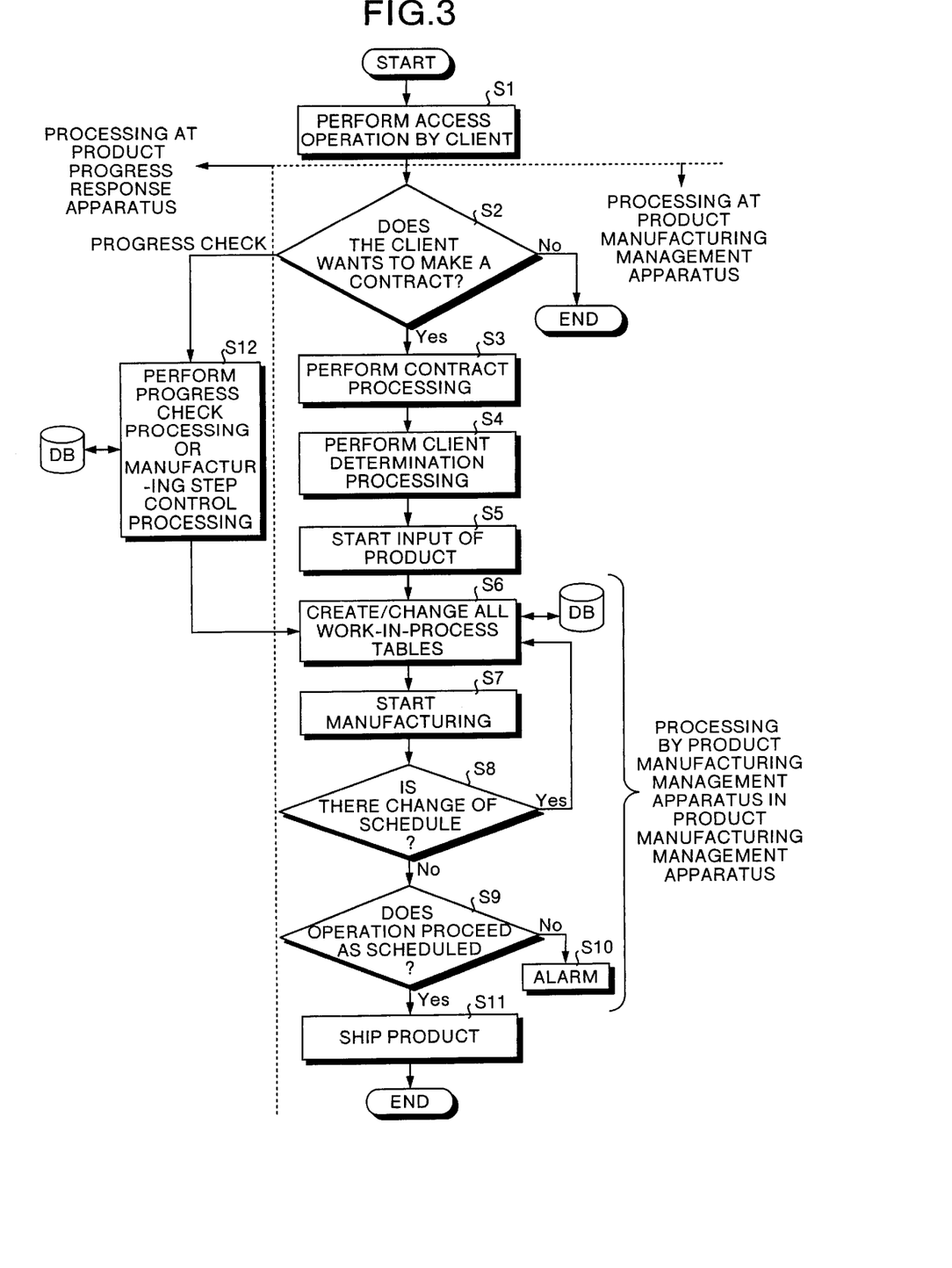
FIG. 3 is a flow chart which shows the process procedures of a production management method according to the present invention.

FIG. 3 is a flow chart of the production management method of the present invention. The production management method includes a product manufacturing management program and a product progress response program. The product manufacturing management program is executed by the product manufacturing management apparatus. The product progress response program is executed by the product progress response apparatus. The production management method also controls all the processes of the system within 24 hour duration. For example the time frame could range from the contract phase until shipping of the product.

The client 1 accesses the reception screen 4 when the client 1 wants to make a request to the manufacturer to manufacture a product. The reception screen 4 serves as the reception window for the product progress response apparatus 2 and the product manufacturing management apparatus 3. In step S1 the reception screen 4 notifies the product manufacturing management apparatus 3 when the client 1 wants to hold a contract with the manufacturer. In this case at the contract stage of step S2 the client 1 selects a contract screen in the reception screen 4.

Figure 4:
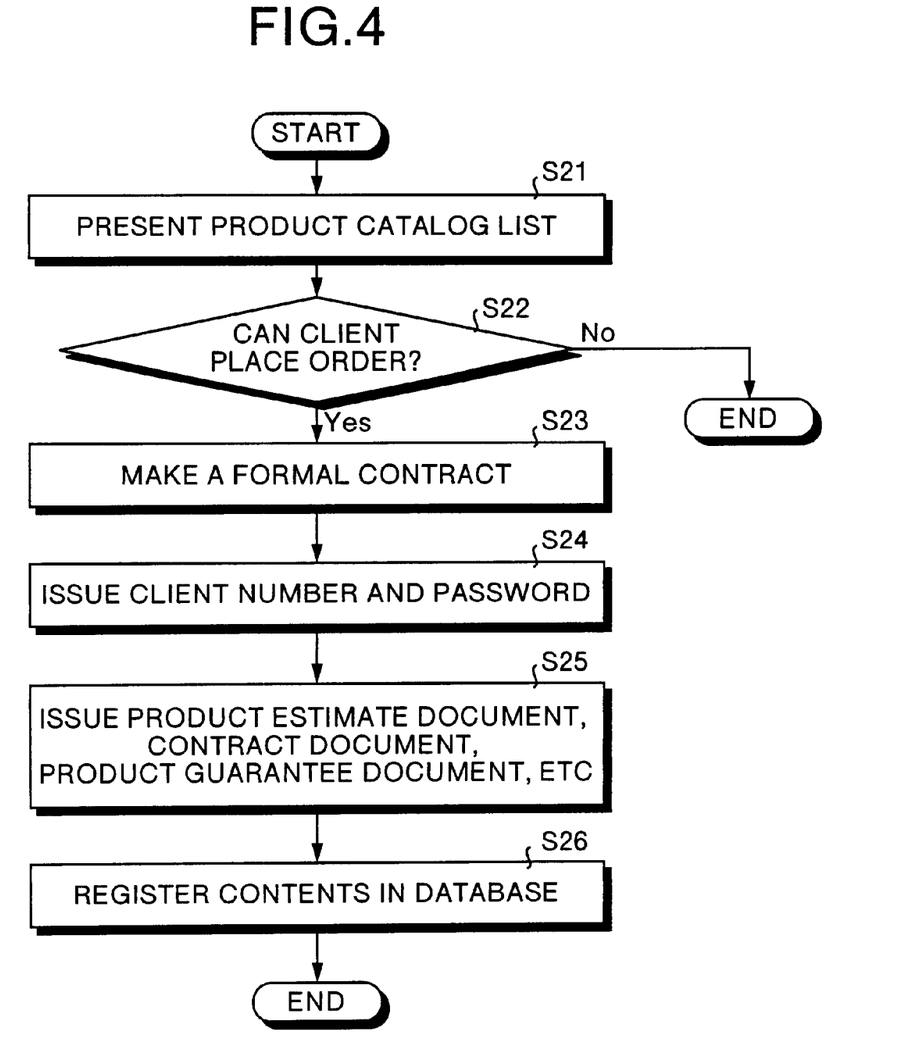
FIG. 4 is a flow chart which clearly shows the content of contract process.

The contract process is executed between the client 1 and the product manufacturing management apparatus 3 at Step S3 when the client 1 selects the contract screen of the reception screen 4. FIG. 4 is a flow chart which clearly shows the details of the contract processing.

With reference to FIG. 4 the product manufacturing management apparatus 3 provides the client 1 with product information at step S21 and waits for the response of the client 1 at step S22. If the client 1 wants to place an order indicated as Yes at step S22, client 1 informs the manufacturer through the product manufacturing management apparatus 3 and initiates a formal contract at step S23. The product manufacturing management apparatus 3 issues a client number and a password to the client 1 at step S24. In this manner the product manufacturing management apparatus 3 and the product progress response apparatus 2 can individually deal with clients. Previous information such as client numbers, passwords, delivery dates, product importance and the like that is stored in the product manufacturing management apparatus 3 can also be presented to the clients.

The product manufacturing management apparatus 3 issues a product estimate document, a contract document, and a product guarantee document online at step S25. It then registers the contents of the document in the database at step S26. As a result, the manufacturing process management apparatus of the product manufacturing management apparatus 3 can automatically determine the manufacturing process of the product. It is also possible for the manufacturer to issue the contract documents in written format to the client.

On completion of the contract process at step S3, the product manufacturing management apparatus 3 analyzes the success or failure of the client, the degree of importance of the client and the degree of difficulty of the manufacturing of the product based on the information stored in the database. The degree of difficulty is judged based on product manufacturing grade, product volume, and delivery time. The product manufacturing management apparatus 3 determines a schedule based on factors such as manufacturing turnover, manpower, current production volume, work-in-progress volume, equipment operating status and the like using a statistical scheme at step S4. The product manufacturing management apparatus 3 registers a client number of the client (e.g., 1234), a product number (e.g., AAAA), the number of stages (e.g., FL01A), degree of product importance or client priority, (e.g., A0N where N: Normal, S: Special), and a manufacturing number (L99010510260A) in association with the client ID. The product number contains a manufacturing machine (e.g., L), planned shipping date (e.g., May 1, 1999), reception time (e.g., 10:26) and an additional number (0A).

The statistical scheme improves quality of the product by statistically processing the data stored in the DB. The statistical scheme includes Pareto diagram, graph, control chart, scatter diagram, stratification, histogram and, process capability. The statistical scheme can numerically express the manufacturing status of the concerned process and product.

The data generated by the statistical scheme can be instantly reflected in production and assembly process thus improving the quality of the product and the manufacturing process.

At step S5 the product manufacturing management apparatus 3 inputs a product to a production line as requested by client 1 based on the schedule determined by the product manufacturing management apparatus 3.

Figure 5A:
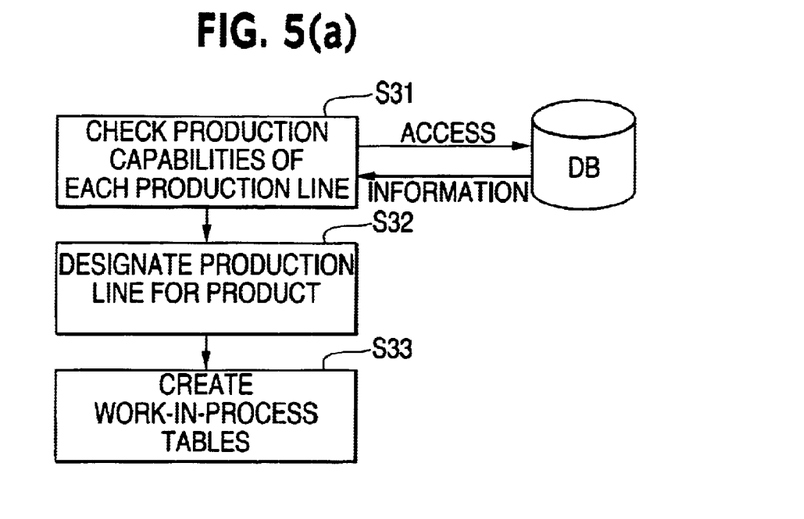
FIGS. 5a–5b is a flow chart in respect of a work-in-progress table creation process and a diagram which shows production capabilities that is input to a database.
Figure 5B:
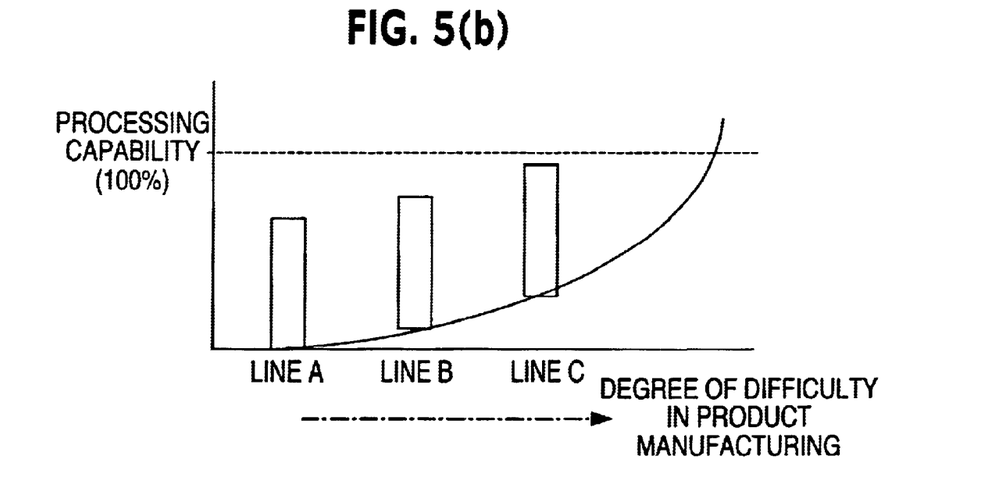

The manufacturing process management apparatus creates work-in-progress tables related to the manufacturing process at step S6. FIG. 5(a) is a diagram that shows a flow chart related to the work-in-progress table creation process. FIG. 5(b) is a graph that shows the production capabilities of production lines that is input to the database of manufacturing process management apparatus. The product stock volume and production capabilities information are input into the database of manufacturing process management apparatus in advance.

At step S31 the manufacturing process management apparatus checks the production capabilities of the production lines based on the information that is input to the database of the manufacturing process management apparatus. At step S32 the manufacturing process management apparatus designates a production line which can manufacture the product requested by the client 1 based on the information provided by the database of the manufacturing process management apparatus. The manufacturing process step is assigned to the equipment handling that process based on the analysis of production capabilities as shown in FIG. 5(a). In FIG. 5(b) the degree of difficulty of product manufacturing progressively increases from line A to line C. Line A has the highest processing capability and the line C has the lowest. The curve shown in FIG. 5(b) represents that the number of products depends on degree of difficulty in product manufacturing.

The manufacturing process management apparatus checks the predetermined schedule and manufacturing status of the designated line and automatically creates a work-in-progress table at step S33. The contents of the work-in-progress table are added to the database of manufacturing process management apparatus. The manual operation in the creation of work-in-progress table is thus eliminated.

After creation of work-in-progress table the manufacturing process management apparatus initiates manufacturing/assembly of the product at step S7. In FIG. 3 in case of trouble such as the shortage of material or shortage of processing capability of the machine that is indicated as Yes at step S8, the manufacturing process management apparatus is alarmed. The manufacturing process management apparatus allocates the operation to a different process and reflects the change in the work-in-progress table at step S6. Therefore the trouble is appropriately dealt with by not stopping a production line. In case there is no trouble indicated by No at Step S8 the process checks if the operation is proceeding as scheduled at step S9.

If the operation is not proceeding as scheduled indicated as No at step S9, a delivery time delay alarm is output to the reception screen that is accessed by the client 1 through the product manufacturing management apparatus 3 at step S10. Therefore even if there is a delay in schedule the client can be notified about the state of delay. The delivery time delay alarm cannot be identified unless the client accesses the product progress response apparatus 2 to execute a progress status check processing. If the operation is proceeding as scheduled indicated by Yes at step S9, the product manufacturing management apparatus 3 instructs the shipping of the product at step S11. The product manufacturing management program is completed after completing the production/assembling of the product.

When the client 1 wants to check the progress status or control manufacturing process, the client 1 accesses the reception screen 4 using the public line at step S1. The reception screen 4 serves as the reception window to apparatuses 2 and 3 as it is connected to the product progress response apparatus 2 and the product manufacturing management 3. The client 1 selects the screen of the product progress response apparatus 2 by entering a password at step S2 to check the progress.

The product progress response apparatus 2 executes the progress status check or manufacturing process control at step S12 on selection of the screen of the product progress response apparatus 2 by the client 1. The process control includes change of delivery time, cancellation of product, and change of order volume.

Figure 6:
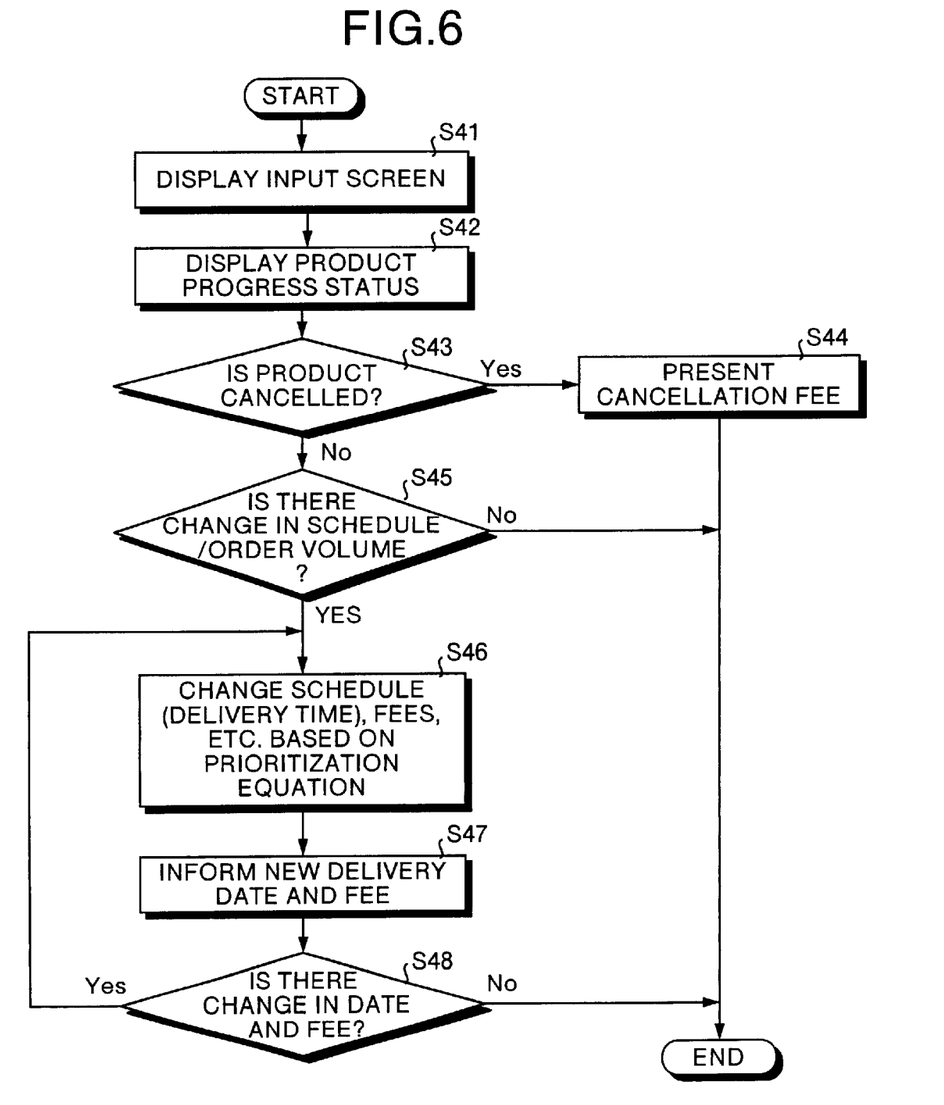
FIG. 6 is a flow chart which shows process of a product progress response program according to the present invention.

FIG. 6 is a flow chart that shows the process of the product progress response program. The product progress response apparatus 2 displays a screen to the client 1 through the reception screen 4 at step S41. When the client 1 enters the appropriate company name, client code and password, the product progress response apparatus 2 displays the product progress status at step S42.

Figure 7:
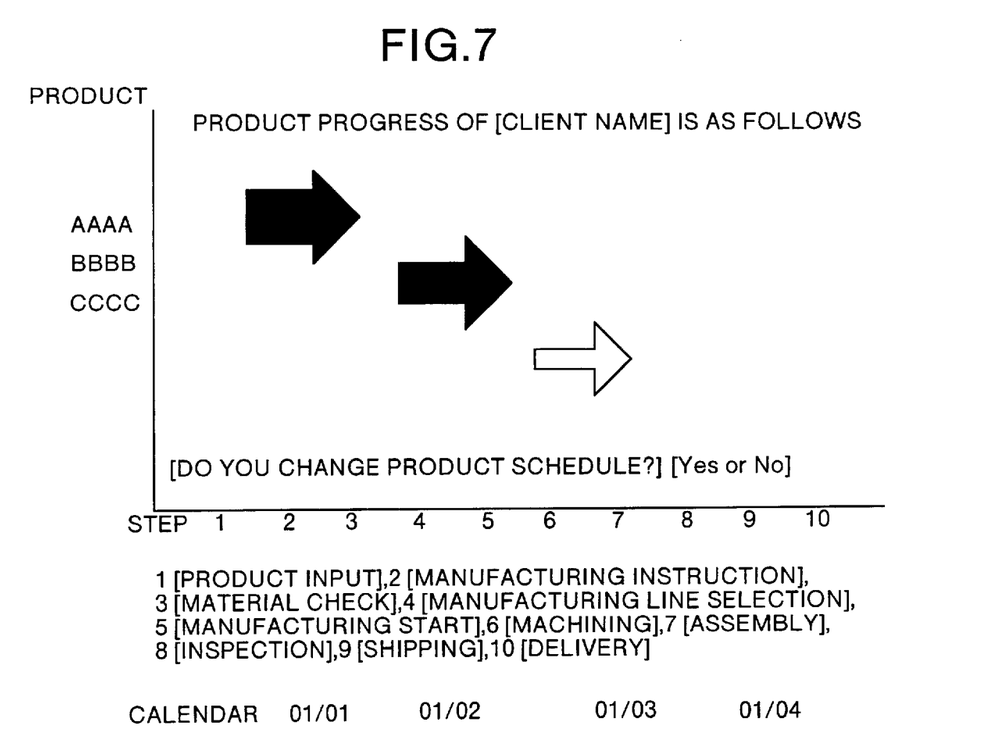
FIG. 7 is a diagram which shows a product progress table held by a manufacturing process management apparatus.

FIG. 7 is a diagram that shows the product progress chart held by the product process management apparatus. The three products AAAA, BBBB and CCCC flow on the production line. The operation of product AAAA proceeds up to step 3, product BBBB proceeds up to step 5 and product CCCC proceeds up to step 7. The steps indicated in the diagram are the different steps of the manufacturing process that include product input 1, manufacturing instruction 2, material check 3, manufacturing line selection 4, manufacturing start 5, machining 6, assembly 7, inspection 8, shipping 9, and packaging and delivery 10. The thickness of arrow of each product expresses the degree of product importance.

In this manner the degree of product importance and the progress status corresponding to each client can be clearly expressed. The product progress information is thus held by the manufacturing process management apparatus. The progress status of the product is notified only to the client concerned with the product. If a check is carried out by telephone, a voice message saying that your product: MMMM is at the fifth stage of the process and the planned delivery time of your product is DD, serves to guide the client.

If the client 1 cancels the product which is now in the course of manufacturing indicated by Yes at step S43, the product progress response apparatus 2 presents a specified cancellation fee at step S44. The process is thus terminated at this stage. Therefore even if the product is cancelled in the middle of the process it is possible to make a cancellation fee according to the stage of cancellation. If the client 1 does not cancel the product that is in the course of manufacturing indicated by No at step S43, the process continues. If the client 1 does not change the product in the course of manufacturing indicated by No at step S45, the process continues.

If the client 1 changes the product in the course of manufacturing indicated by Yes at step S45, the client is presented with the changed schedule and fee at step 47. The change request includes change in schedule or order volume. The product progress response apparatus 2 changes the schedule, fees and the like based on the equation for prioritization at process 46.

Prioritization=Degree of product importance (client priority)×product grade×reception and delivery time When there is a change of schedule or order volume the calculation of the cancellation fee is not limited to the result of equation is performed. For example, the calculation is done by the weight coefficient depending on the number of times the system is accessed. If the client 1 wants to further change the process step S46 to S48 are repeatedly executed until the change process is completely finished.

Figure 8:
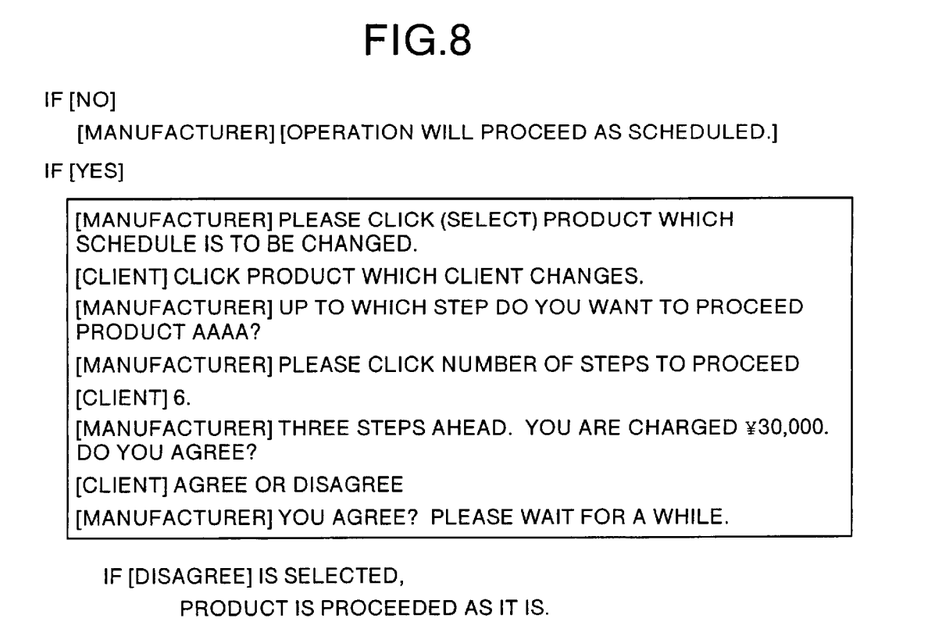
FIG. 8 is a diagram which shows how a schedule manufacturing process is changed.

FIG. 8 shows how a schedule manufacturing process is changed at step S8. Even if a change is done in the middle of the production it is possible to make a reasonable change of schedule and fee according to the stage of change.

As explained so far, the production management network system according to the present invention comprises of the product manufacturing management apparatus 3 and the product progress response apparatus 2. The product manufacturing management apparatus 3 holds a product-manufacturing contract and controls the manufacturing process that is operated by the client. The product progress response apparatus grasps the progress status and controls the manufacturing process by the operation of the client. The client can control product manufacturing from the outside of the production management network system. It is also possible to recognize the product progress status at real time and to change manufacturing process any time by employing the public line. Therefore it is possible to reflect the client's intention in the manufacturing of the product more efficiently.

INDUSTRIAL APPLICABILITY

The production management network system according to the present invention is useful for the production management as it is a 24-hour operating system. It is particularly suitable for the semiconductor manufacturing management system where semiconductors are produced in large numbers without manpower.

What is claimed is:

1. A production management network system comprising:
   a product manufacturing management apparatus that is operated by a client to perform a manufacturing contract and to control a manufacturing process; and
   a product progress response apparatus that is operated by the client to obtain information about a progress status of a manufacturing process and to control the manufacturing process,
   wherein the product progress response apparatus and the product manufacturing management apparatus are connected to each other through a platform screen which serves as a coexistent area, the product manufacturing management apparatus issues an identification code to the client after establishing the manufacturing contract with the client, and the product progress response apparatus enables the client to get information on the progress status and to control the manufacturing process after identifying the identification code of the client.

2. The production management network system according to claim 1, wherein the product progress response apparatus is configured so as to enable the client to obtain access thereto through a public communication line.

3. The production management network system according to claim 1, wherein the product manufacturing management apparatus issues a product estimate document, a contract document, and a product guarantee document to the client after establishment of the manufacturing contract.

4. The production management network system according to claim 3, wherein the product manufacturing management apparatus checks a production capability of a production line, determines equipment that handles a product, and creates a detailed schedule for each step in the manufacturing process.

5. The production management network system according to claim 4, wherein the product manufacturing management apparatus employs a statistical scheme to create a detail schedule for each step of the manufacturing process.

6. The production management network system according to claim 4, wherein the product manufacturing management apparatus is alarmed when there is a shortage of material or processing capability of machine and allocates a production of the product to another production line.

7. The production management network system according to claim 6, wherein if an operation is not proceeding as scheduled, an alarm of delay in delivery time is output to a reception screen that is accessed by the client.

8. The production management network system according to claim 1, wherein the manufacturing process is divided into a plurality of operations, and the product manufacturing management apparatus generates a diagram that indicates to which operation the manufacturing process has proceeded by an arrow and expresses a degree of product importance by a thickness of the arrow, and
   the product progress response apparatus displays the progress status of a product on a reception screen for a reference to the client.

9. The production management network system according to claim 8, wherein a cancellation fee is charged to the client when the manufacturing process is cancelled by the client during a course of the manufacturing process.

10. A production management network system comprising:
    a product manufacturing management apparatus that is operated by a client to perform a manufacturing contract and control a manufacturing process; and
    a product progress response apparatus that is operated by the client to get information about a progress status of the manufacturing process and control the manufacturing process,
    wherein the product progress response apparatus and the product manufacturing management apparatus are connected to each other through a platform screen which serves as a coexistent area, the product progress response apparatus or the product manufacturing management apparatus is configured so as to enable the client to obtain access thereto a public communication line, the manufacturing process is divided into a plurality of operations, and the product manufacturing management apparatus generates a diagram that indicates to which operation manufacturing has proceeded by an arrow, expresses degree of product importance by thickness of arrow, the product progress response apparatus displays the progress status of a product on a reception screen for a reference to the client, wherein a cancellation fee is charged to the client when the manufacturing process is cancelled by the client during a course of the manufacturing process, and when there is a change of schedule or order volume during the course of the manufacturing process, a schedule and fees are calculated based on prioritization that is obtained by an equation set forth below:

Prioritization=degree of product importance×product grade×reception and delivery time.

11. A production management method comprising:

connecting a product progress response apparatus and a product manufacturing management apparatus to each other through a platform screen which serves as a coexistent area;

enabling a client to perform an operation to make a manufacturing contract and control a manufacturing process through the platform screen;

issuing an identification code to the client after establishing a manufacturing contract with the client;

enabling the client to input the identification code of the client; and enabling a client to perform an operation to get information about a progress status of the manufacturing process and to control the manufacturing process through the platform screen after identifying the identification code of the client.

12. A computer readable medium for storing instructions, which when executed on a computer, causes the computer to perform operations of:

displaying information for a client and accepting data from the client so that the client performs an operation to make a manufacturing contract and controls a manufacturing process;

enabling a client to perform an operation to make the manufacturing contract according to the information displayed;

issuing an identification code to the client after establishing the manufacturing contract with the client;

enabling the client to input the identification code of the client;

displaying information about a progress status of a manufacturing process for the client; and enabling the client to control the manufacturing process according to the information displayed after identifying the identification code of the client.

13. A production management network system controlled by a client, comprising:

a product manufacturing management apparatus that, upon issuing an identification code to the client and establishing a manufacturing contract with the client, is operated by the client to perform the manufacturing contract and to control a manufacturing process;

a product progress response apparatus that, after identifying the identification code of the client, is operated by the client to obtain information about a progress status of the manufacturing process and to control the manufacturing process; and a reception/platform screen, coupled to the product manufacturing management apparatus and the product progress response apparatus, that is utilized by the client to operate the product manufacturing management apparatus and the product progress response apparatus.

* * * * *